(12) United States Patent
Neerumalla

(10) Patent No.: US 10,841,089 B2
(45) Date of Patent: Nov. 17, 2020

(54) KEY MANAGERS FOR DISTRIBUTED COMPUTING SYSTEMS

(71) Applicant: NUTANIX, INC., San Jose, CA (US)

(72) Inventor: Bala Rama Koteswara Rao Neerumalla, Seattle, WA (US)

(73) Assignee: Nutanix, Inc., San Jose, CA (US)

( * ) Notice: Subject to any disclaimer, the term of this patent is extended or adjusted under 35 U.S.C. 154(b) by 6 days.

(21) Appl. No.: 15/687,080

(22) Filed: Aug. 25, 2017

(65) Prior Publication Data
US 2019/0068370 A1  Feb. 28, 2019

(51) Int. Cl.
H04L 9/08 (2006.01)
H04L 9/14 (2006.01)
H04L 9/32 (2006.01)

(52) U.S. Cl.
CPC .......... *H04L 9/0897* (2013.01); *H04L 9/0822* (2013.01); *H04L 9/0861* (2013.01); *H04L 9/14* (2013.01); *H04L 9/3226* (2013.01); *H04L 2209/127* (2013.01)

(58) Field of Classification Search
CPC .................................................... H04L 9/0897
See application file for complete search history.

(56) References Cited

U.S. PATENT DOCUMENTS

| | | | | |
|---|---|---|---|---|
| 4,633,245 A * | 12/1986 | Blount | ................ | G06F 13/1663 340/2.1 |
| 4,720,782 A * | 1/1988 | Kovalcin | ............ | G06F 11/3055 700/83 |
| 5,239,630 A * | 8/1993 | Lary | ..................... | G06F 13/368 710/119 |
| 5,946,685 A * | 8/1999 | Cramer | ............... | G06F 16/1774 |
| 6,545,981 B1 * | 4/2003 | Garcia | ................ | G06F 12/0292 370/242 |
| 6,594,701 B1 * | 7/2003 | Forin | .................. | G06F 12/1081 709/232 |
| 6,615,383 B1 * | 9/2003 | Talluri | ................. | H04L 1/1614 714/749 |
| 6,732,139 B1 * | 5/2004 | Dillenberger | ........... | G06F 9/505 709/226 |
| 6,738,344 B1 * | 5/2004 | Bunton | ................... | H04L 45/02 370/216 |

(Continued)

OTHER PUBLICATIONS

Poitras, Steven. "The Nutanix Bible" (Oct. 15, 2013), from http:// stevenpoitras.com/the-nutanix-bible/ (Publication date based on indicated capture date by Archive.org; first publication date unknown).

(Continued)

*Primary Examiner* — Bradley W Holder
(74) *Attorney, Agent, or Firm* — Dorsey & Whitney LLP

(57) ABSTRACT

Examples described herein may provide local key managers on computing nodes of distributed computing systems. The local key managers may protect secrets (e.g. cryptographic keys) in the distributed system such that risk of compromise is reduced or eliminated. In some examples, secure processors, such as trusted platform modules (TPMs), may be incorporated in computing nodes of distributed computing systems described herein. The secure processor may aid in securely protect cryptographic keys in the event of disk or node theft, for example.

27 Claims, 6 Drawing Sheets

(56) References Cited

U.S. PATENT DOCUMENTS

| | | | | |
|---|---|---|---|---|
| 6,826,541 | B1* | 11/2004 | Johnston | G06Q 30/02 |
| | | | | 702/179 |
| 6,870,814 | B1* | 3/2005 | Bunton | H04L 12/64 |
| | | | | 370/217 |
| 6,973,473 | B1* | 12/2005 | Novaes | G06F 9/465 |
| | | | | 370/389 |
| 7,421,688 | B1* | 9/2008 | Righi | H04L 67/34 |
| | | | | 709/202 |
| 8,549,518 | B1 | 10/2013 | Aron et al. | |
| 8,601,473 | B1 | 12/2013 | Aron et al. | |
| 8,719,590 | B1 | 5/2014 | Faibish et al. | |
| 8,850,130 | B1 | 9/2014 | Aron et al. | |
| 8,855,318 | B1 | 10/2014 | Patnala et al. | |
| 9,667,416 | B1* | 5/2017 | Machani | H04L 63/06 |
| 9,680,805 | B1* | 6/2017 | Rodgers | H04L 61/6013 |
| 9,772,866 | B1 | 9/2017 | Aron et al. | |
| 9,864,874 | B1 | 1/2018 | Shanbhag et al. | |
| 9,954,680 | B1* | 4/2018 | Machani | H04L 9/085 |
| 2001/0036276 | A1 | 11/2001 | Ober et al. | |
| 2005/0138374 | A1 | 6/2005 | Zheng et al. | |
| 2009/0252330 | A1 | 10/2009 | Patnala et al. | |
| 2010/0290623 | A1 | 11/2010 | Banks et al. | |
| 2011/0085664 | A1 | 4/2011 | Cross et al. | |
| 2011/0138475 | A1 | 6/2011 | Gordon et al. | |
| 2011/0202916 | A1 | 8/2011 | Voba et al. | |
| 2011/0246785 | A1* | 10/2011 | Linsley | G06F 21/602 |
| | | | | 713/189 |
| 2012/0110328 | A1 | 5/2012 | Pate et al. | |
| 2014/0089683 | A1 | 3/2014 | Miller et al. | |
| 2014/0096182 | A1* | 4/2014 | Smith | H04L 67/10 |
| | | | | 726/1 |
| 2015/0220745 | A1 | 8/2015 | Nellitheertha et al. | |
| 2015/0318986 | A1* | 11/2015 | Novak | H04L 63/0428 |
| | | | | 713/189 |
| 2015/0355979 | A1 | 12/2015 | Volvovski et al. | |
| 2015/0358161 | A1 | 12/2015 | Kancharla et al. | |
| 2016/0080149 | A1 | 3/2016 | Mehta et al. | |
| 2016/0352518 | A1 | 12/2016 | Ford et al. | |
| 2016/0359622 | A1 | 12/2016 | Bunch et al. | |
| 2017/0005990 | A1 | 1/2017 | Birger et al. | |
| 2017/0019385 | A1 | 1/2017 | Yoo | |
| 2019/0238323 | A1* | 8/2019 | Bunch | H04L 9/0877 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.corn/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, Ignacio et al. "Curator: Self-Management Storage for Enterprise Clusters"; University of Washington; published Mar. 2017; pp. all.

* cited by examiner

KEY MANAGERS FOR DISTRIBUTED COMPUTING SYSTEMS

TECHNICAL FIELD

Examples described herein relate generally to distributed computing systems, Examples of virtualized systems are described. Key managers are provided in some examples of distributed computing systems described herein to facilitate secure storage of secrets.

BACKGROUND

Computing systems are generally desired to protect sensitive data, Encryption based on keys (e.g. cryptographic keys) is commonly used to secure data, e.g. using symmetric keys or public-private key pairs. Dedicated hardware security modules (HSMs) or key management servers KMSs) are available to securely store keys used for protecting sensitive data. For distributed systems, local HSMs may be attached to each node, or Network HSMs or KMS products may be used that store keys. However, requiring dedicated HSMs or KMSs may add prohibitive or undesirable expense in some examples.

Distributed systems may store keys locally using password protection. This requires a user to manually supply the password during node restart or service restart. If the password is stored locally, security may be comprised if an attacker obtains control of the computing node (e.g. in the case of disk or node theft), such that they have access to the password, the key encrypted with the password, and the data encrypted with the key.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Examples described herein may provide local key managers on computing nodes of distributed computing systems. The local key manager may protect secrets (e.g. cryptographic keys) in the distributed system such that risk of compromise is reduced or eliminated. In some examples, secure processors, such as trusted platform modules (TPMs), may be incorporated in computing nodes of distributed computing systems described herein. The secure processor may securely protect cryptographic keys in the event of disk or node theft, for example.

Accordingly, examples described herein may use secure processors, such as TPMs, to securely store keys in a distributed system where theft of a node or multiple nodes may still protect data at rest. While TPMs are described, any secure hardware (e.g. other secure processors, custom FPGAs, etc.) with a key sealed in it and with restricted functionality that prohibits or reduces risk of leaking the key may be used. The hardware sealed key may be used to ultimately protect other generated keys and/or secrets. For example, the hardware sealed key may be used to encrypt a master key (which may be, e.g. a data encryption key and/or used to generate other data encryption keys), and the encrypted master key may be stored on other nodes in a distributed system. The metadata about which nodes contain the encrypted master keys may be stored either locally or in a central location.

Each computing node may fetch the encrypted keys stored on other nodes using a private network connection or may have similar restrictions such as firewall rules that disallow an attacker stealing a node to retrieve the encrypted keys from outside the cluster. Various mechanisms can be taken in other examples to ensure only when the node is part of the cluster it should be allowed to retrieve the encrypted keys required to reconstruct a master key.

Figure 1:
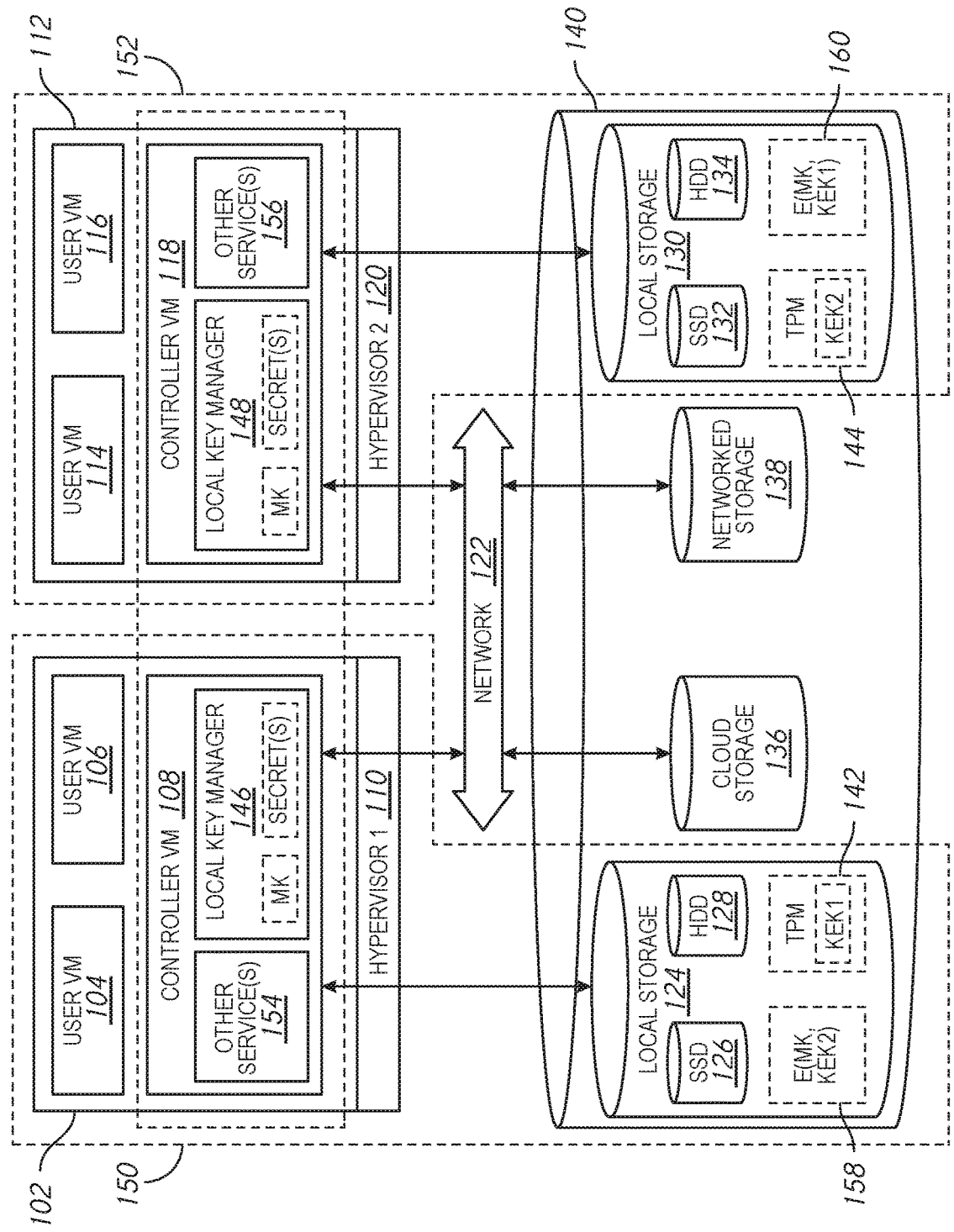
FIG. 1 is a block diagram of an example distributed computing system, arranged in accordance with examples described herein.

FIG. 1 is a block diagram of an example distributed computing system, arranged in accordance with examples described herein. The distributed computing system of FIG. 1 generally includes computing node 102 and computing node 112 and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof. The network 122 may be a wired network, a wireless network, or a combination thereof.

The storage 140 may include local storage 124, local storage 130, cloud storage 136, and networked storage 138. The local storage 124 may include, for example, one or more solid state drives (SSD 126) and one or more hard disk drives (HDD 128), Similarly, local storage 130 may include SSD 132 and HDD 134. Local storage 124 and local storage 130 may be directly coupled to, included in, and/or accessible by a respective computing node 102 and/or computing node 112 without communicating via the network 122. Cloud storage 136 may include one or more storage servers that may be stored remotely to the computing node 102 and/or computing node 112 and accessed via the network 122. The cloud storage 136 may generally include any type of storage device, such as HDDs, SSDs, or optical drives. Networked storage 138 may include one or more storage devices coupled to and accessed via the network 122. The networked storage 138 may generally include any type of storage device, such as HDDs, SSDs, or optical drives. In various embodiments, the networked storage 138 may be a storage area network (SAN).

The computing node 102 is a computing device for hosting VMs in the distributed computing system of FIG. 1. The computing node 102 may be, for example, a server computer, a laptop computer, a desktop computer, a tablet computer, a smart phone, or any other type of computing device. The computing node 102 may include one or more physical computing components, such as processors. Hardware 150 of the computing node 102 is shown in FIG. 1 and may include local storage 124. TPM 142 may be hardware of the computing node 102 itself, as shown in FIG. 1. Hardware 152 of the computing node 112 is shown in FIG. 1 and may include local storage 130. TPM 144 may be hardware of the computing node 112 itself, as shown in FIG. 1.

The computing node 102 is configured to execute a hypervisor 110, a controller VM 108 and one or more user VMs, such as user VMs 104, 106. The user VMs including user VM 104 and user VM 106 are virtual machine instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux. While a certain number of user VMs are shown, generally any number may be implemented. Generally, multiple tiers of storage may be included in storage 140. Virtual disks (e.g. "vDisks") may be structured from storage devices in the storage 140. A vDisk may generally refer to a storage abstraction that may be exposed by services, e.g. controller VMs, described herein, to be used by a user VM. In some examples, vDisks may be exposed using interfaces such as iSCSI ("internet small computer system interface") or NFS ("network file system") and may be mounted as a virtual disk on one or more user VMs.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 108) and performs various VM related operations, such as creating new VMs and cloning existing VMs.

Controller VMs described herein, such as the controller VM 108 and/or controller VM 118, may provide services for the user VMs in the computing node. Generally, controller VMs may be used to manage storage and/or I/O activities of the computing node. Controller VMs may in some examples run as virtual machines above hypervisors, such as hypervisor 110 and hypervisor 120. Multiple controller VMs in a distributed system may work together to form a distributed system which manages storage 140. Generally, each controller VM, such as controller VM 108 and controller VM 118, may export one or more block devices or NFS server targets which may appear as disks to client VMs (e.g. user VMs). These disks are virtual, at least because they are implemented by software executing the controller VM. In this manner, to user VMs, controller VMs may appear to be exporting a clustered storage appliance that contains some disks. User data (including the operating system in some examples) in the user VMs may reside on these virtual disks.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. In the embodiment of FIG. 1, the hypervisor 120 may be a different type of hypervisor than the hypervisor 110. For example, the hypervisor 120 may be Hyper-V, while the hypervisor 110 may be ESX(i).

The controller VM 108 and controller VM 118 may communicate with one another via the network 122. By linking the controller VM 108 and controller VM 118 together via the network 122, a distributed network of computing nodes including computing node 102 and computing node 112, can be created.

Controller VMs, such as controller VM 108 and controller VM 118, may each execute a variety of services and may coordinate, for example, through communication over network 122. Moreover, multiple instances of the same service may be running throughout the distributed system—e.g. a same services stack may be operating on each controller VM. For example, an instance of a service may be running on controller VM 108 and a second instance of the service may be running on controller VM 118. Controller VMs may provide a variety of services which may perform a variety of tasks, including, but not limited to, data deduplication tasks, quality of service (QOS) functions, encryption, and compression.

In some examples, controller VMs may be the primary software component within a node that virtualizes I/O access to hardware resources within storage 140. In this manner, a controller VM may be provided for each computing node in a distributed computing system described herein (e.g. a virtuallized data center). Each computing node may include a controller VM to share in an overall workload of the system to handle storage tasks.

Controller VMs described herein may implement a local key manager, such as local key manager 146 and local key manager 148. Other services of the controller VM, such as other service(s) 154 of controller VM 108 or other service(s) 156 of controller VM 118 may utilize secrets which are desirably secretly stored. For example, the secrets may be encrypted or otherwise obfuscated. Accordingly, local key managers described herein may store one or more secrets utilized by other services of the controller VM. Secrets which may be stored by local key managers described herein, include encryption keys, such as private encryption keys, identity credentials (e.g. IDs, passwords, and/or certificates), and/or data. Secrets may be used by controller VMs for a variety of purposes, including encrypting and/or decrypting data, or authenticating communications. The secrets are stored by local key managers described herein encrypted with a master key for the local key manager service. Accordingly, the master key used in multiple or all computing nodes of a distributed computing system may be the same, allowing any computing node with access to the master key to obtain access to the secret(s) stored by any instance of the local key manager in the distributed computing system.

For example, the local key manager 146 may store secret(s) encrypted with a master key, MK, During operation, the local key manager 146 may have access to the master key MK. The local key manager 148 may also store secret(s) encrypted with the master key MK. The secret(s) stored by local key manager 148 may be the same or different than the secret(s) stored by the local key manager 146. During operation, because the local key manager 146 has access to the master key MK, the local key manager 146 may access secret(s) stored by other local key managers in the distributed computing system, such as the local key manager 148, because the local key manager 148 has stored secrets encrypted with the same master key MK. Accordingly, other service(s) 154 and/or other service(s) 156 may store secret(s) using local key manager 146 and/or local key manager 148. This may relieve other service(s) 154 and/or other service(s) 156 of a need to provide their own secure secret storage service. Examples of methods and systems described herein provide further security for the master key MK to reduce or eliminate the ability for MK to be compromised. For example, examples of methods and systems described herein may reduce the ability for the master key MK to be compromised in the event of node or disk theft.

MK may be stored in a memory of the local computing node (e.g. the node 102 and computing node 112). When the local key manager of the node (e.g. the local key manager 146 and/or local key manager 148) goes down, such as by power-off or other service disruption, the master key MK will need to be obtained again by the local computing node.

Computing nodes described herein may use one or more secure processors, such as TPMs, to protect the master key utilized by the local key manager. TPM 142 and TPM 144 are shown in FIG. 1. TPM 142 and TPM 144 are hardware implemented physically on the computing node 102 and computing node 112, respectively. Secure processors described herein, such as TPM 142 and TPM 144 may securely store data (e.g., a key encryption key) needed for a node to obtain the master key MK for the local key manager services. For example, TPM 142 stores KEK1. KEK1 may be stored by the TPM 142, for example, encrypted by a storage root key (SRK) of the TPM 142. In other examples, the KEK1 encrypted by the SRK may be stored in a location accessible to computing node 102. TPM 142 may be required to obtain access to KEK1.

When the local key manager 146 of computing node 102 desires to obtain MK (e.g. on being added to a cluster, on startup, or during a recovery from service disruption), the computing node 102 may access an encrypted version of MK from another node. The encrypted version of MK accessed at another node may be encrypted using a key which may be stored at the requesting node, and may in some examples be protected by the requesting node's secure processor. In other examples, the key used to encrypt MK may be stored without protection by a secure processor, such as being stored in plain text at the requesting node. The computing node 102 may obtain E(MK, KEK1) 160, a version of MK encrypted with KEK1, from the computing node 112. To request the encrypted master key, the local key manager 146 may access metadata specifying which nodes contain the encrypted keys. The metadata may be stored in storage 140. The computing node 102 may provide the E(MK, KEK1) 160 to TPM 142 and request that TPM 142 decrypt the E(MK, KEK1) 160 using KEK1. The TPM 142 may return the MK to computing node 102 for use by local key manager 146. In some examples, computing node 102 may provide KEK1 encrypted with the SRK for TPM 142 to TPM 142 and receive KEK1, which may then be utilized to decrypt E(MK, KEK1) 160. In this manner, a computing node may access two items to obtain MK: (1) information derived from MK (e.g. an encrypted version of MK) stored at another node; and (2) information stored at the requesting node, which may be protected by a secure processor at the requesting computing node (e.g. the secure processor may be used to decrypt the encrypted version of MK retrieved from the another node) or optionally in some examples, to decrypt a key used to encrypt the encrypted version of MK retrieved from the another node. Analogously, the computing node 112 may obtain E(MK, KEK2) 158, a version of MK encrypted with KEK2, from computing node 102. To request the encrypted master key, the local key manager 148 may access metadata specifying which nodes contain the encrypted keys. The metadata may be stored in storage 140. The computing node 112 may provide the E(MK, KEK2) 158 to TPM 144 and request that TPM 144 decrypt the E(MK, KEK2) 158 using KEK2. The TPM 144 may return the MK to computing node 112 for use by local key manager 148. In some examples, computing node 112 may provide KEK2 encrypted with the SRK for TPM 144 to TPM 144 and receive KEK2, which may then be utilized to decrypt E(MK, KEK2) 158. Note that the master key encrypted with the key encryption key (KEK) of that node is not stored on the same node as the KEK used to encrypt it. For example, the master key encrypted with KEK2 is not stored at computing node 112. The master key encrypted with KEK1 is not stored at computing node 102. In this manner, theft of computing node 102 and/or computing node 112 would not result in sufficient information to obtain MK.

In some examples, additional security may be provided by setting passwords (e.g. cryptographically random passwords) for each TPMs storage root key (SRK) which may be stored in distributed fashion on other nodes without storing it on the local node. In this manner, an attacker may need to both fetch the encrypted data encryption key and the SRK password to obtain the master key.

Accordingly, local key managers described herein, such as local key manager 146 and local key manager 148 may utilize a master key which requires, to be obtained at a node, data stored at computing nodes of the distributed system other than the computing node at which it is being obtained. Local key managers described herein may modify the master key used by the local key managers to provide information derived from the master key. For example, local key managers described herein may encrypt the master key. Other modifications may be used in other examples. In some examples, the keys may be encrypted using information accessible at the computing node on which the local key manager is running. The local key manager, e.g. local key manager 146, may store the encrypted master key at a computing node other than the computing node 102. For example, local key manager 146 may store the encrypted master key at computing node 112, e.g. using local storage 130.

Accordingly, local key managers described herein may provide secure secret storage. Any number of secrets may be stored by local key managers described herein. In some examples, the number and size of secrets stored and/or managed by the local key manager is such that the secrets may be stored on the computing node of the local key manager, e.g. In the file system. The master key MK used to encrypt secrets stored by local key managers in a distributed computing system may generally be shared (e.g. the same) at each computing node of the computing system, such that each node having access to MK may access secrets stored at other nodes. For example, MK may be used to encrypt any number of keys used by other services (e.g. the other service(s) 154 and/or other service(s) 156). The encrypted keys may be stored by the local key manager.

Local key managers may store at least a portion of the information derived from the master key at another node of the distributed computing system, different from the node storing information which may be used to obtain the master key. The portion of data derived from the master key may be stored at a single other computing node, or multiple other computing nodes. In some examples, different portions of information needed to obtain a master key may be stored at different computing nodes. In this manner, in order to obtain the master key, information from another computing node of the distributed system must be obtained. Note that after shutdown or powerdown of a local key manager, the master key used by the service is no longer available to the computing node. The master key must be obtained at startup or power on. Accordingly, even if an attacker obtains physical possession of a computing node (e.g., through theft), it may not be possible to generate the master key used to protect secrets stored by the local key manager, because data from other nodes of the distributed computing system may be necessary to obtain the master key.

On restarting or powering up a computing node, the computing node, e.g. a local key manager, running on the computing node, may request the information (or portion thereof) derived from the master key from one or more other computing nodes at which it may be stored. Metadata specifying which data may be used to obtain which master keys may generally be stored anywhere in storage 140. Access to the information may be restricted to requests from within the distributed computing system, e.g. by restricting access to be from network 122 and/or use of firewall or other access rules. The local key manager may combine this retrieved information with information stored at the computing node to obtain the master key.

Each computing node may generally have a different key encryption key, such as KEK for computing node 102 shown in FIG. 1 and KEK2 for computing node 112. In this manner, two items may be required to obtain a master key used by a local key manager: (1) information stored at another node; and (2) information stored at the local node. The information stored at the local node may be protected physically, e.g. using a secure crypto processor such as a TPM.

While described herein as keys, generally local key managers may provide protection for any secrets.

During use, secrets protected by local key managers described herein may be used for encryption and/or decryption. For example, the local key manager 146 may receive a request for a data encryption key (e.g. from one or more of the other service(s) 154). The local key manager 146 may have a stored secret which is a data encryption key for use by the other service(s) 154 for data encryption. The data encryption key may be encrypted by the master key. The local key manager 146 may utilize the master key to decrypt the data encryption key and provide the data encryption key to the other service(s) 154. The other service(s) 154 may utilize the data encryption key to encrypt and/or decrypt data. The encrypted data may be stored, e.g. in local storage 124 or other storage in storage 140 accessible to computing node 102.

During use, controller VMs may utilize secrets protected by local key managers for authentication of communications. For example, when a service at computing node 102 wants to communicate with another service, it may utilize local key manager 146 to store its identity credentials that can be used to authenticate to other service(s). For example, a key or other secret (e.g. a password) protected by the local key manager 146 may be used to authenticate a communication sent and/or received by a service running on computing node 102.

In other examples, keys or other secrets stored inside local key managers described herein may be used to provide keys for applications which may utilize computing nodes described herein. For example, one of the other service(s) 154 may be a key management service. The key management service may itself have a key management service master key protected by the local key manager 146. The key management service may protect secrets for other user VMs and/or user applications using the key management service master key.

Figure 2:
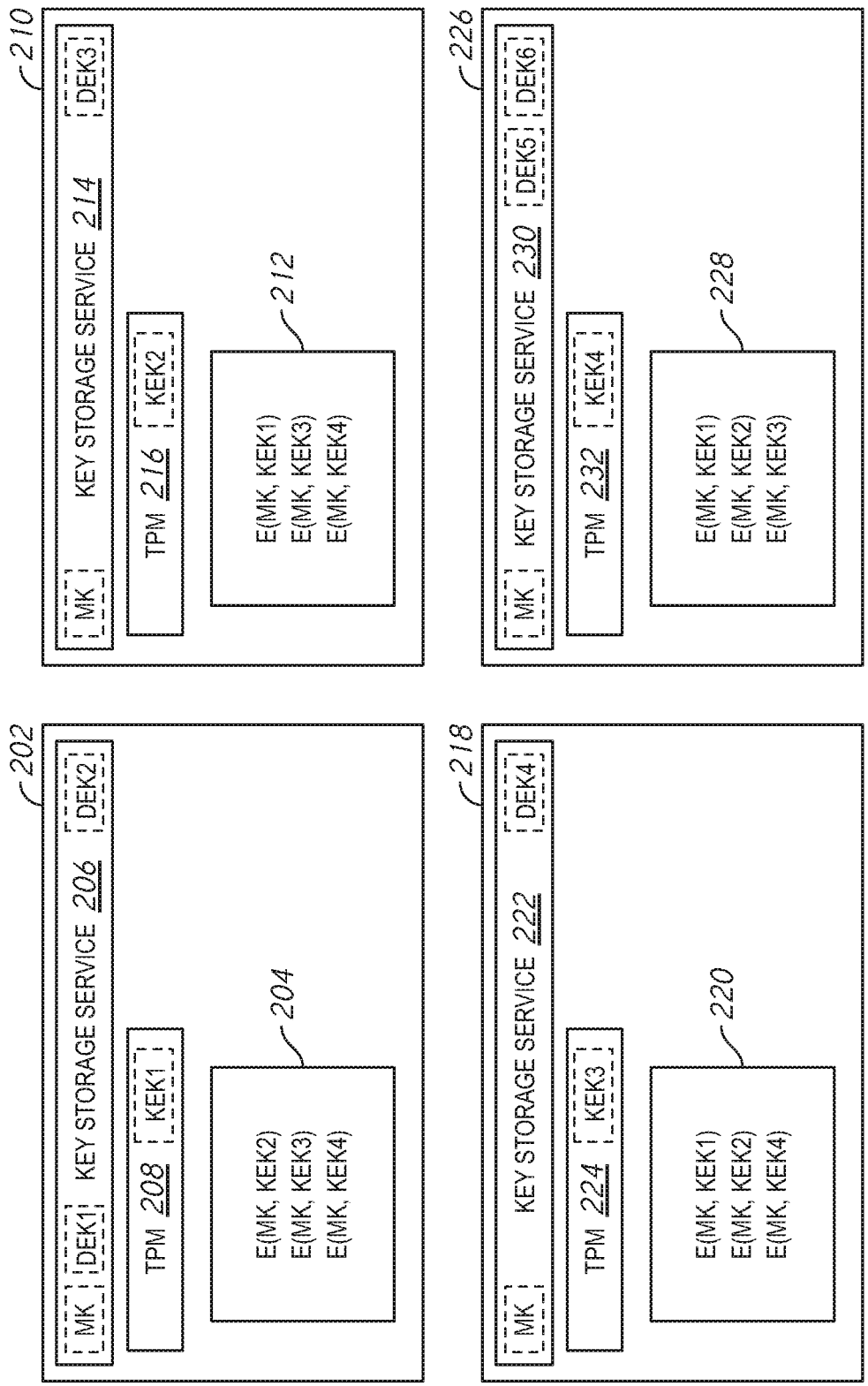
FIG. 2 is a schematic illustration of a distributed computing system arranged in accordance with examples described herein.

FIG. 2 is a schematic illustration of a distributed computing system arranged in accordance with examples described herein. The distributed computing system of FIG. 2 includes node 202, node 210, node 218, and node 226. Any of these nodes may be implemented by or used to implement, for example computing node 102 and/or computing node 112 of FIG. 1 in some examples. While four nodes are shown in FIG. 2, any number of nodes may be used in some examples. As described with reference to FIG. 1, the nodes may generally be connected over a network, and may virtualize and share a pool of storage resources. Storage details are not shown in FIG. 2 to avoid obscuring the detail regarding storage and management of keys provided by local key managers described herein.

Each of the nodes in FIG. 2 includes a local key manager—local key manager 206, local key manager 214, local key manager 222, and local key manager 230, respectively. Generally, each node of a distributed computing system described herein may run a local key manager. In some examples, certain nodes may not include a local key manager, however. Local key managers described herein are generally software services which run (e.g. execute) on one or more processing units (e.g. processors) of a computing node.

Each of the nodes in FIG. 2 further includes a TPM. Generally, each node of a distributed computing system described herein may include a secure crypto processor (e.g. a TPM) or other mechanism for securing a secret (e.g. password protection). In the example of FIG. 2, each node includes a TPM—TPM 208, TPM 216, TPM 224, and TPM 232, respectively. The secure crypto processor of each node may protect a secret (e.g. a key) that may be used to obtain a master key used by local key managers described herein. In the example of FIG. 2, TPM 208 protects KEK1, TPM 216 protects KEK2, TPM 224 protects KEK3, and TPM 232 protects KEK4.

Local storage for each node is also illustrated in FIG. 2—local storage 204, local storage 212, local storage 220, and local storage 228, respectively. FIG. 2 illustrates what data is stored at each node to obtain master keys used by the local key managers in the distributed computing system. The local storage shown forms part of the physical hardware of the node in some examples.

Each local key manager may utilize a master key ("MK" as shown in FIG. 2) to encrypt other secrets (e.g. keys) protected by the local key manager. As shown in FIG. 2, the master key utilized by each local key manager in the distributed computing system may be the same, or different master keys may be used on other examples. In the example of FIG. 2, each of the local key managers—local key manager 206, local key manager 214, local key manager 222, and local key manager 230—utilize a same master key MK. The master key may be utilized to encrypt secrets protected by the local key managers. Local key managers may provide any number of secrets, such as data encryption keys (DEKs). Local key manager 206 is shown providing MK, DEK1, and DEK2. DEK1 and DEK2 may be stored at node 202 encrypted by MK. In this manner, MK will be needed to obtain DEK1 and DEK2 after shutdown and/or power down of the node. Local key manager 214 is shown providing MK and DEK3. DEK3 may be stored at node 210 encrypted with MK. In this manner, MK will be needed to obtain DEK3 after shutdown and/or power down. Local key manager 222 is shown as providing MK and DEK4. DEK4 may be stored at node 218 encrypted with MK. In this manner, MK will be needed to obtain DEK4 after shutdown and/or power down. Local key manager 230 is shown as providing MK, DEK5, and DEK6. DEK5 and DEK6 may be stored at node 226 encrypted with MK. In this manner, MK will be needed to obtain DEK5 and DEK6 after shutdown and/or powerdown. Local key managers may generally store any number of secrets (e.g. keys) locally encrypted with a master key. As described herein, information from other node(s) may be needed to obtain the master key.

The master key utilized by a local key manager may be encrypted utilizing a key or other secret stored at a node. For example, MK at node 202 may be encrypted utilizing KEK1. The data used to encrypt the master key may be protected by a secure crypto processor, such as TPM 208. The encryption of MK using KEK1 yields an encrypted master key—e.g. encrypted data represented as E(MK, KEK1). Each node may generate an encrypted master key representing the master key encrypted with a secret protected at that node (e.g. utilizing a TPM). So node 210 may encrypt MK utilizing KEK2 to provide E(MK, KEK2). The node 218 may encrypt MK utilizing KEK3 to provide E(MK, KEK3). The node 226 may encrypt MK utilizing KEK4 to provide E(MK, KEK4).

The master key encrypted with the key encryption key of one node may be stored at a different node of the distributed computing system. In some examples, the master key encrypted with the key encryption key of one node may be stored at multiple, or all, other nodes of the distributed computing system However, the master key encrypted with a key encryption key of one node may generally not be stored at the node which provides the key encryption key. In the example of FIG. 2, the master key encrypted with KEK2, KEK3, and KEK4 is stored at node 202, however, node 202 does not store the master key encrypted with KEK1. The master key encrypted with KEK1—E(MK, KEK1)—is stored at node 210, node 218, and node 226. On restart or powerup, to obtain E(MK, KEK1), the local key manager 206 requests E(MK, KEK1) from node 210, node 218, and/or node 226. Metadata specifying where the encrypted master keys are stored may be stored in the distributed computing system accessible to node 202. On receipt of E(MK, KEK1) from another node, local key manager 206 may decrypt E(MK, KEK1) using KEK1 protected using TPM 208, thereby recovering the master key. Once the master key MK is recovered, the local key manager 206 may recover DEK1 and DEK2 by decrypting the stored versions of those keys with MK. In this manner, theft of node 202 would not result in an ability to recover the master key, since E(MK, KEK1) may not be able to be obtained.

In an analogous manner, node 210 may store E(MK, KEK1), E(MK, KEK3), and E(MK, KEK4). The node 210 may not, however, store E(MK, KEK2) which may be required by node 210 to recover MK. Node 218 may store E(MK, KEK1), E(MK, KEK2), and E(MK, KEK4). The node 218 may not, however, store E(MK, KEK3), which may be required by node 218 to recover MK. Node 226 may store E(MK, KEK1), E(MK, KEK2), and E(MK, KEK3). The node 226 may not, however, store E(MK, KEK4), which may be required by node 226 to recover MK.

In this manner, local key managers described herein may be provided on every controller VM in a distributed computing system. The local key managers may use a shared master key (e.g. MK). However, in some examples, one or more local key managers may have a different master key than one or more other local key managers. The master key may only be fetched by the local key manager, however, if the local key manager is part of the distributed computing system (e.g. cluster). Local key managers may create shared keys and/or local keys, which may be encrypted with the master key. Shared keys may be accessed by multiple controller VMs in the distributed computing system, or all controller VMs in the distributed computing system in some examples. For example, identity asymmetric keys for services may be provided as shared keys by local key managers described herein. Instances of a service may store a shared data encryption key and use it to provide encryption capabilities to other services. In some examples, shared keys may be used by distributed databases to encrypt sensitive data and/or as an authentication secret across components distributed across nodes. Local keys may be accessed only by a single computing node and may be used, for example, for self-encrypting drive encryption at a local node or for authentication purposes.

While the description of FIG. 2 has been provided in the context of storage of data encryption keys, it is to be understood that other secrets may be stored and protected in other examples.

Figure 3:
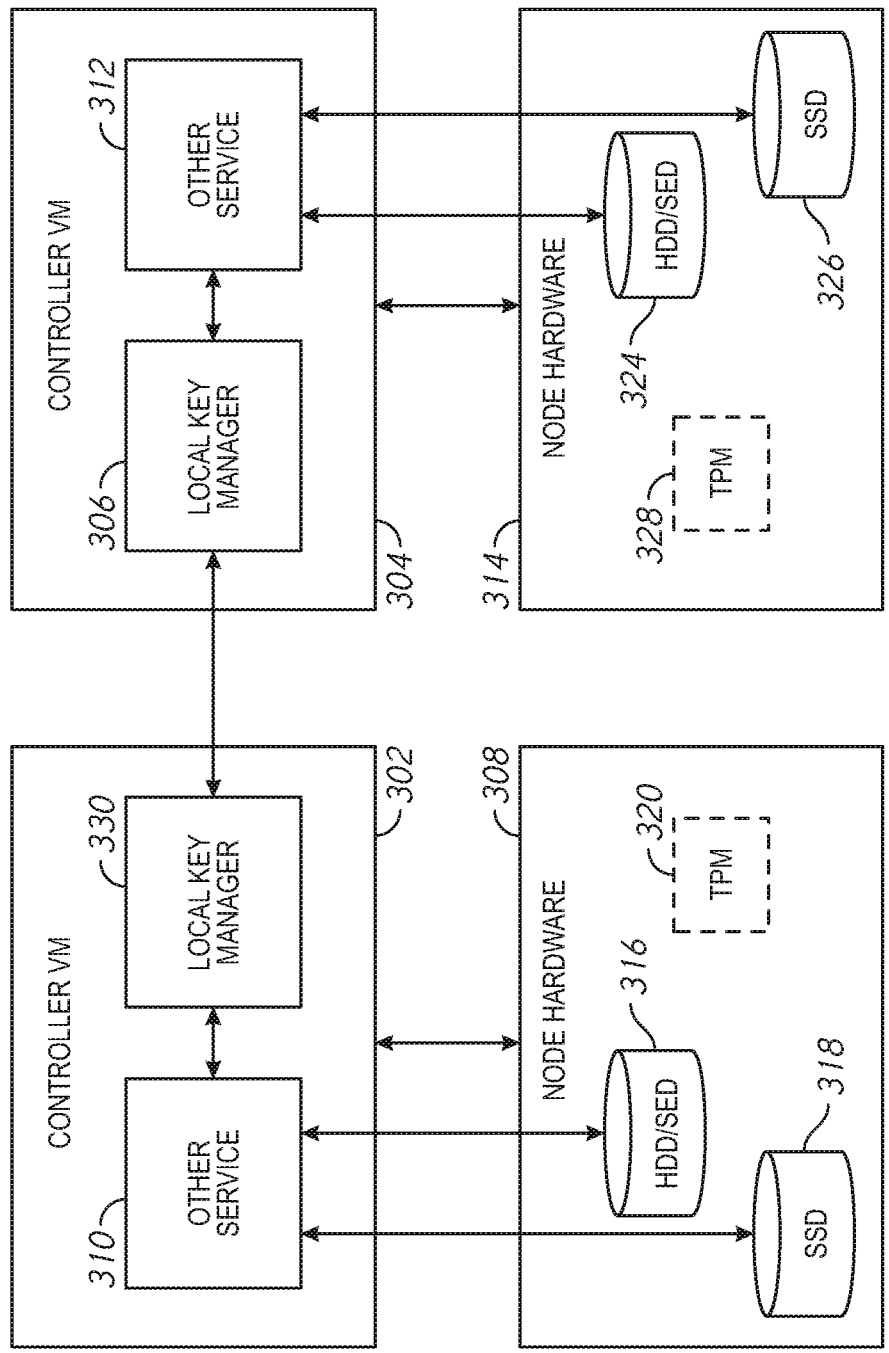
FIG. 3 is a schematic illustration of a distributed computing system arranged in accordance with examples described herein.

FIG. 3 is a schematic illustration of a distributed computing system arranged in accordance with examples described herein. The system of FIG. 3 depicts several components used when local key managers described herein are used to facilitate encryption and/or decryption of stored data. The distributed computing system of FIG. 3 includes two computing nodes—one with controller VM 302 and another with controller VM 304. Any number of computing nodes may be present in some examples.

Each computing node in the distributed computing system of FIG. 3 includes a local key manager—e.g. local key manager 306 and local key manager 330, Moreover, each controller VM includes some other service—e.g. other service 310 and other service 312. The other service may be a service providing encryption and/or decryption of data, or having another function involving the encryption and/or decryption of data. Any number of other services may be provided on each controller VM of a distributed computing system described herein, and the services provided at one controller VM may be the same or different than services provided on another controller VM.

Each computing node may have certain physical hardware resources, including node hardware 308 associated with controller VM 302 and node hardware 314 associated with controller VM 304. The node hardware may include one or more hard disk drives (HDD) and/or self-encrypting drive (SED) and/or solid state drives (SSD)—e.g. HDD/SED 316, SSD 318 connected to controller VM 302 and HDD/SED 324 and SSD 326 connected to controller VM 304. As described herein, each computing node may further include a secure crypto processor, such as TPM 320 in communication with controller VM 302 and TPM 328 in communication with controller VM 304.

Example operation of local key manager 330 in use for services encrypting and/or decrypting data will be described. Local key manager 306 may operate in an analogous manner. During operation, other service 310 may have a need to encrypt and/or decrypt data. Other service 310 may request a data encryption key from local key manager 330. The local key manager 330 may provide a data encryption key to the other service 310. The local key manager 330, as described herein, may provide a data encryption key which may not be obtained without the use of data stored on other nodes of the distributed computing system and additionally in some examples without further use of data protected by a secure crypto processor (e.g. TPM 320). The other service 310 may utilize the data encryption key to encrypt data and store the encrypted data in HDD/SED 316, SSD 318, or other storage accessible to the controller VM 302. The other service 310 may utilize the data encryption key to decrypt data stored on HDD/SED 316, SSD 318, or other storage accessible to controller VM 302. Note that, in the event of theft of the computing node including the controller VM 302 and the local storage 314, an attacker would be unable to decrypt the stored data because they would be unable to obtain the data encryption key without obtaining data from other computing nodes in the system.

Figure 4:
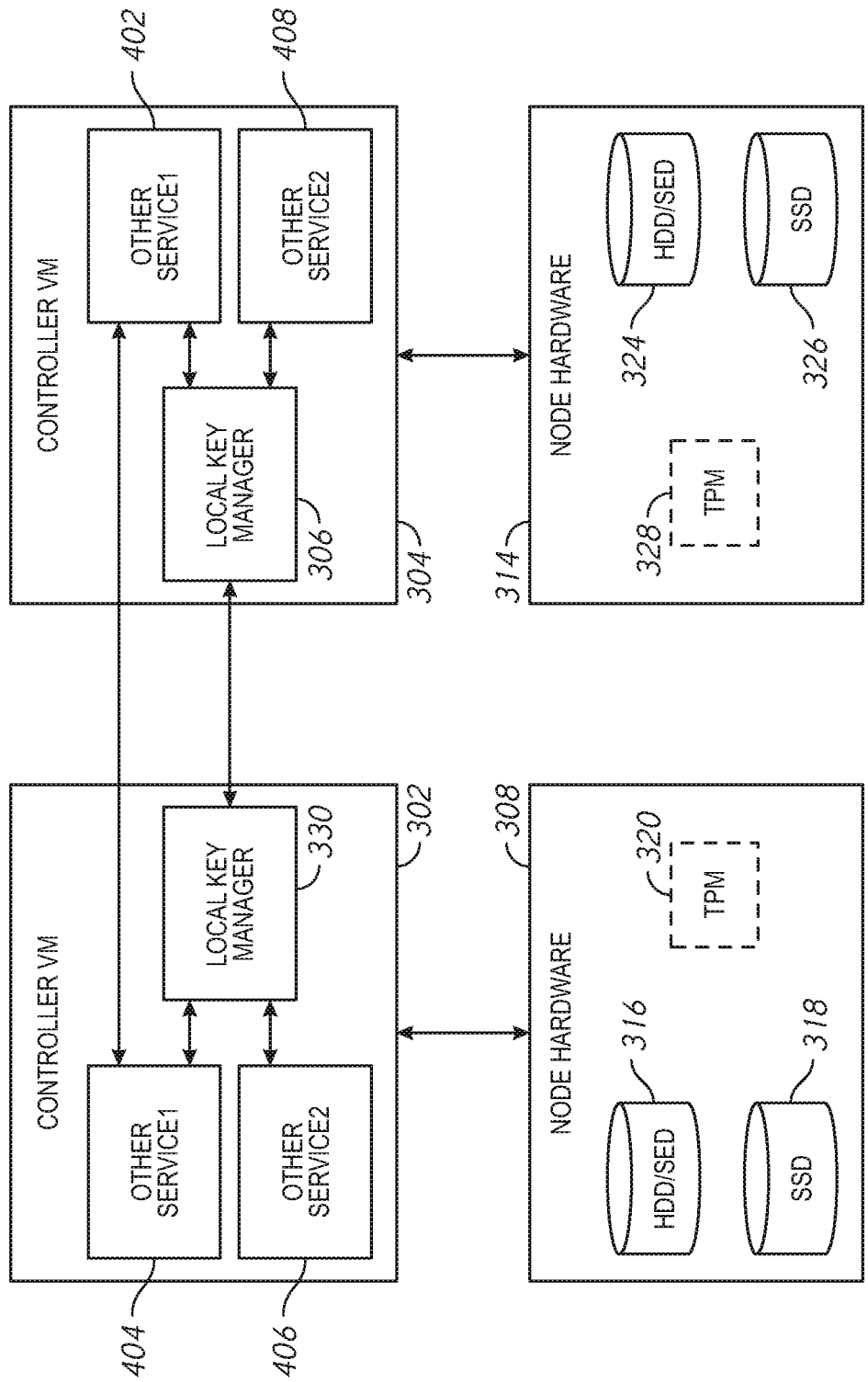
FIG. 4 is a schematic illustration of a distributed computing system arranged in accordance with examples described herein.

FIG. 4 is a schematic illustration of a distributed computing system arranged in accordance with examples described herein. The system of FIG. 4 depicts several components used when local key managers described herein are used to authenticate communications between nodes in the distributed computing system. The distributed computing system of FIG. 4 includes components which have been described with reference to FIG. 3 and bear the same reference numerals. Each controller VM includes some other service—e.g. other service1 402, other service2 406, other service1 404, and other service2 408. The other services may be services which communicates with other computing nodes (e.g. the service 402 and service 404 may communicate with one another, e.g. over a network 122). For example, other service1 402 and other service1 404 may be instances of a same service operating on the controller VM 304 and controller VM 302 respectively. It may be desirable to ensure that communications originating from and/or destined for an instance of other service1 are only sent to and/or received by other instances of service1 in some examples. Any number of other services may be provided on each controller VM of a distributed computing system described herein, and the services provided at one controller VM may be the same or different than services provided on another controller VM.

Example operation of local key manager 330 in use for services in authenticating communications will be described. Local key manager 306 may operate in an analogous manner. During operation, other service1 404 may have a need to communicate with another node and/or receive a communication from another node, such as other service1 402 on controller VM 304. Other service 404 may request identity credentials from local key manager 330. The local key manager 330 may provide identity credentials (e.g. one or more private key(s)) to the other service1 404. In some examples, the local key manager 330 may access a permissions database or other data structure correlating identity credentials with accounts which may access the identity credentials. Accordingly, local key manager 330 may be able to provide service1 identity credentials to other service1 404, but may not provide service1 identity credentials to other service2 406. Similarly, the local key manager 306 may provide service1 identity credentials to the other service1 402 but may not provide service1 identity credentials to other service2 408 The identity credentials provided by the local key manager 330 and/or local key manager 306 may be used to authenticate communications, e.g. encrypt and/or decrypt communications between other service1 404 and other service1 402.

The local key manager 330, as described herein, may protect identity credentials using a master key which may not be obtained without the use of data stored on other nodes of the distributed computing system and additionally in some examples without further use of data protected by a secure crypto processor (e.g. TPM 320). In some examples, all instances of a same service on each computing node in a system may utilize same identity credentials (e.g. encryption key), and the identity credentials may be used to identify the service from which the communication originated. For example, other service1 404 and other service1 402 may be two instances of a same service. Each of other service1 404 and other service1 402 may utilize a same identity credential to encode and/or authenticate communications.

While the other services 402 and 404 utilizing the local key managers to facilitate authentication have been described separately from the other services in FIG. 3 used to encrypt and/or decrypt data, it is to be understood that some computing nodes may contain both types of services and/or in some examples one service may perform both functions. For example, other service 404 and other service 310 of FIG. 4 may be included on a same node in some examples.

Figure 5:
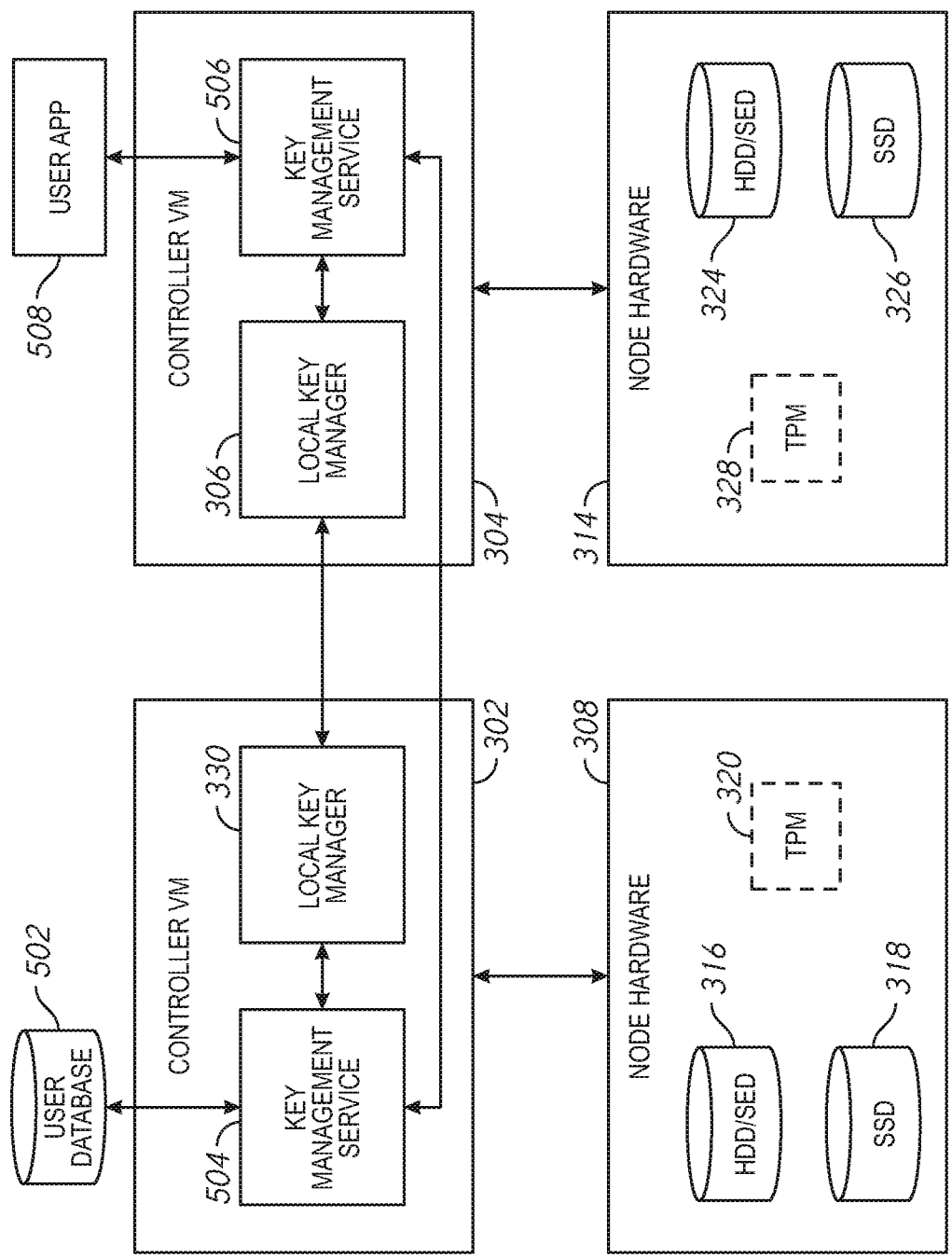
FIG. 5 is a schematic illustration of a distributed computing system arranged in accordance with examples described herein.

FIG. 5 is a schematic illustration of a distributed computing system arranged in accordance with examples described herein. The system of FIG. 5 depicts several components used when local key managers described herein are used to support key management services which may be exposed to user databases and/or applications (e.g. user VMs), The distributed computing system of FIG. 5 includes a number of components which are analogous to those in FIG. 3 and FIG. 4 and bear the same reference numerals.

Each controller VM in FIG. 5 includes a key management service e.g. key management service 504 and key management service 506. The key management services may utilize a key management service master key to protect secrets used by user databases and/or applications (e.g. user VMs). The key management service master key may be a secret which is protected by local key managers described herein. Accordingly, key management services may obtain key management services master keys from local key managers (e.g. local key manager 330 and/or local key manager 306) and utilize the key management services master keys to protect secrets that may be provided to user databases and/or user applications (e.g. user VMs), such as user database 502 and/or user app 508. Any number of other services may be provided on each controller VM of a distributed computing system described herein, and the services provided at one controller VM may be the same or different than services provided on another controller VM.

Example operation of local key manager 330 and key management service 504 will be described. Local key manager 306 and key management service 506 may operate in an analogous manner. During operation, key management service 504 may receive a request for a secret (e.g. a key) from a user database or user application (e.g. a user VM) such as user database 502. The key management service 504 may decrypt the requested secret using a key management service master key. The key management service master key may be protected by the local key manager 330. For example, the key management service master key may be encrypted with the master key of the local key manager 330. As described herein, the master key of the local key manager 330 may be protected using data stored at other computing nodes and/or stored using crypto processor(s). The requested secret provided by the key management service 504 may be used by the user application and/or user database for any purpose for which a secret may be desirable or utilized. In this manner, the distributed computing system may itself provide keys to user applications, and expensive dedicated key services may not be needed in some examples.

While the operation of key management service 504 and key management service 506 have been described with reference to FIG. 5 separately to the operation of other services, it is to be understood that in some examples, different services may be provided on each computing node. For example, the other service 310 of FIG. 3 and/or the other service 404 of FIG. 4 may both be provided on controller VM 302 together with the key management service 504. In some examples, the services may be integrated together into a single service (e.g. a service which may both authenticate communications and encrypt/decrypt data and/or be exposed to provide keys to users).

Figure 6:
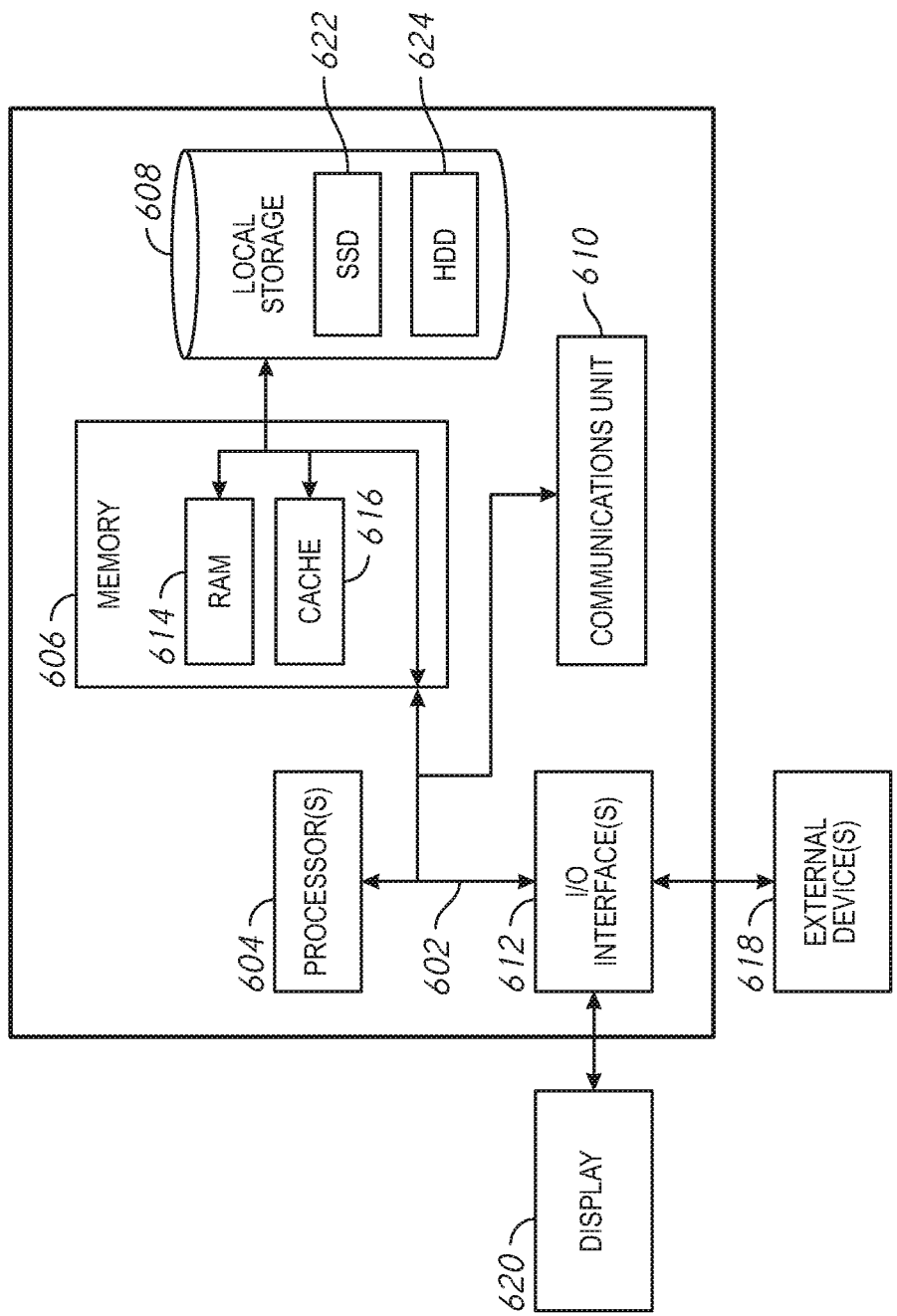
FIG. 6 depicts a block diagram of components of a computing node in accordance with examples described herein.

FIG. 6 depicts a block diagram of components of a computing node in accordance with an embodiment of the present invention. It should be appreciated that FIG. 6 provides only an illustration of one implementation and does not imply any limitations with regard to the environments in which different embodiments may be implemented. Many modifications to the depicted environment may be made. The computing node of FIG. 6 may be used to implement and/or be implemented by any of the computing nodes described herein.

The computing node of FIG. 6 includes a communications fabric 602, which provides communications between one or more processor(s) 604, memory 606, local storage 608, communications unit 610, I/O interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the local storage 608 are computer-readable storage media. In this embodiment, the memory 606 includes random access memory RAM 614 and cache 616. In general, the memory 606 can include any suitable volatile or non-volatile computer-readable storage media. The local storage 608 may be implemented as described above with respect to local storage 124 and/or local storage 130. In this embodiment, the local storage 608 includes an SSD 622 and an HDD 624, which may be implemented as described above with respect to SSD 126, SSD 132 and HDD 128, HDD 134 respectively.

Various computer instructions, programs, files, images, etc. may be stored in local storage 608 for execution by one or more of the respective processor(s) 604 via one or more memories of memory 606, in some examples, local storage 608 includes a magnetic HDD 624. Alternatively, or in addition to a magnetic hard disk drive, local storage 608 can include the SSD 622, a semiconductor storage device, a read-only memory (ROM), an erasable programmable read-only memory (EPROM), a flash memory, or any other computer-readable storage media that is capable of storing program instructions or digital information. As described herein, in some examples the processor(s) 604 may include one or more crypto processors, such as a TPM. In other examples, a TPM may be provided as a separate component from the processor(s) 604.

The media used by local storage 608 may also be removable. For example, a removable hard drive may be used for local storage 608. Other examples include optical and magnetic disks, thumb drives, and smart cards that are inserted into a drive for transfer onto another computer-readable storage medium that is also part of local storage 608.

Communications unit 610, in these examples, provides for communications with other data processing systems or devices. In these examples, communications unit 610 includes one or more network interface cards. Communications unit 610 may provide communications through the use of either or both physical and wireless communications links.

I/O interface(s) 612 allows for input and output of data with other devices that may be connected to the computing node of FIG. 6. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software (e.g. executable instructions) and data used to practice embodiments described herein can be stored on such portable computer-readable storage media and can be loaded onto local storage 608 via I/O interface(s) 612. I/O interface(s) 612 also connect to a display 620.

Display 620 provides a mechanism to display data to a user and may be, for example, a computer monitor.

From the foregoing it will be appreciated that, although specific embodiments of the invention have been described herein for purposes of illustration, various modifications may be made without deviating from the spirit and scope of the invention.

What is claimed is:

1. A method comprising:
generating a master key at a first node of a cluster of computing nodes connected via a local network to form a distributed computing system;
modifying the master key to provide information derived from the master key;
providing, via the local network, at least a portion of the information derived from the master key to a second node of the cluster of computing nodes connected to the first node via the local network as part of the distributed computed system for storage at the second node;
after restart of the first node, requesting, via the local network, the at least a portion of the information derived from the master key from the second node of the cluster of computing nodes; and
combining the at least a portion of the information obtained from the second node of the cluster of computing nodes with additional information stored at the first node to obtain the master key.

2. The method of claim 1, further comprising
encrypting the master key with a key encryption key stored at the first node to provide an encrypted master key.

3. The method of claim 2, further comprising protecting the key encryption key using at least one secure crypto processor at the first node.

4. The method of claim 3, further comprising protecting the key encryption key using a trusted platform module (TPM) of the at least one secure crypto processor.

5. The method of claim 2, wherein the information derived from the master key comprises the encrypted master key, and combining the at least a portion of the information with additional information comprises decrypting the encrypted master key with the key encryption key.

6. The method of claim 1, further comprising storing the portion of the information derived from the master key at multiple nodes of the cluster of computing nodes other than the first node.

7. The method of claim 1, further comprising:
decrypting an encrypted data encryption key using the master key to provide a data encryption key; and encrypting data using the data encryption key to provide encrypted data.

8. The method of claim 1, further comprising communicating with the second node utilizing an identity credential fetched using the master key.

9. The method of claim 1, further comprising decrypting a key management services master key using the master key;
decrypting a data encryption key using the key management services master key; and
providing the data encryption key to a user application in communication with the first node.

10. A computing node comprising:
at least one processor; and
memory storing instructions that, when executed by the at least one processor, cause the computing node to:
generate a master key at the computing node, wherein the computing node is part of a cluster of computing nodes connected via a local network to form a distributed computing system;
modify the master key to provide information derived from the master key;
provide, via the local network, at least a portion of the information derived from the master key to another node of the cluster of computing nodes connected to the computing node via the local network for storage at the another node;
after restart of the computing node, request, via the local network, the at least a portion of the information derived from the master key from the another node of the cluster of computing nodes; and
combine the at least a portion of the information obtained from the another node of the cluster of computing nodes with additional information stored at the computing node to obtain the master key.

11. The computing node of claim 10, wherein the instructions further cause the computing node to
encrypt the master key with a key encryption key stored at the computing node to provide an encrypted master key.

12. The computing node of claim 11, wherein the instructions further cause the computing node to decrypt the encrypted master key with the key encryption key using a secure crypto processor.

13. The computing node of claim 12, wherein the instructions further cause the computing node to decrypt the encrypted master key with the key encryption key using a trusted platform module (TPM) of the secure crypto processor.

14. The computing node of claim 11, wherein the information derived from the master key comprises the encrypted master key; and causing the computing node to combine the at least a portion of the information with additional information comprises causing the computing node to decrypt the encrypted master key with the key encryption key.

15. The computing node of claim 10, wherein the instructions further cause the computing node to:
decrypt an encrypted data encryption key utilizing the master key to provide a data encryption key; and
encrypt data using the data encryption key to provide encrypted data.

16. The computing node of claim 10, wherein the instructions further cause the computing node to store the portion of the information derived from the master key at multiple nodes of the distributed computing system other than the computing node.

17. The computing node of claim 10, wherein the instructions further cause the computing node to:

decrypt, at the computing node using the master key, identity credentials received in a communication from a service of one node of the cluster of computing nodes, other than the computing node using the master key; and
authenticate the communication using the identity credentials.

18. The computing node of claim 10, wherein the instructions further cause the computing node to:
decrypt a key management services master key using the master key;
decrypt a data encryption key using the key management services master key;
for provision to a user application in communication with the computing node.

19. A non-transitory, computer readable media encoded with instructions which, when executed, cause a computing node to perform operations comprising:
generating a master key at the computing node, wherein the computing node is included in a cluster of computing nodes connected via a local network to form a distributed computing system;
modifying the master key to provide information derived from the master key;
providing, via the local network, at least a portion of the information derived from the master key to another node of the cluster of computing nodes for storage at the another node;
after restart of the computing node, requesting, via the local network, the at least a portion of the information derived from the master key from the another node of the cluster of computing nodes; and
combining the at least a portion of the information obtained from the another node of the cluster of computing nodes with additional information stored at the computing node to obtain the master key.

20. The non-transitory, computer readable media of claim 19, wherein the instructions further cause the computing node to perform operations comprising encrypting the master key with a key encryption key stored at the computing node to provide an encrypted master key.

21. The non-transitory, computer readable media of claim 20, wherein the information derived from the master key comprises the encrypted master key; and wherein the instructions further cause the computing node to perform operations comprising combining the at least a portion of the information with additional information comprises causing the computing node to decrypt the encrypted master key with the key encryption key.

22. The non-transitory, computer readable media of claim 20, wherein the instructions further cause the computing node to perform operations comprising utilizing at least one secure crypto processor to decrypt the encrypted master key with the key encryption key.

23. The non-transitory, computer readable media of claim 22, wherein the instructions further cause the computing node to perform operations comprising utilizing a trusted platform module (TPM) of the at least one secure crypto processor to decrypt the encrypted master key with the key.

24. The non-transitory, computer readable media of claim 19, wherein the instructions further cause the computing node to perform operations comprising:
receiving data for encryption;
decrypting an encrypted data encryption key utilizing the master key to provide a data encryption key;

encrypting the data using the data encryption key to provide encrypted data; and storing the encrypted data at the computing node.

25. The non-transitory, computer readable media of claim 19, wherein the instructions further cause the computing node to perform operations comprising storing the portion of the information derived from the master key at multiple nodes of the cluster of computing nodes other than the computing node.

26. The non-transitory, computer readable media of claim 19, wherein the instructions further cause the computing node to perform operations comprising:

receiving a communication from a service at one node of the cluster of computing nodes, other than the computing node;

decrypting identity credentials at the computing node using the master key; and authenticating the communication using the identity credentials.

27. The non-transitory, computer readable media of claim 19, wherein the instructions further cause the computing node to perform operations comprising:

decrypting a key management services master key using the master key;

decrypting a data encryption key using the key management services master key for provision to a user application in communication with the computing node.

* * * * *